T. A. PEEBLES

May 9, 1933. APPARATUS FOR CONTROLLING STEAM GENERATION Re. 18,825

Original Filed July 22, 1926 4 Sheets-Sheet 1

INVENTOR
Thomas A. Peebles
By Green & McCallister
His Attorneys

T. A. PEEBLES

May 9, 1933. APPARATUS FOR CONTROLLING STEAM GENERATION Re. 18,825

Original Filed July 22, 1926 4 Sheets-Sheet 2

INVENTOR
Thomas A. Peebles
By Green & McCallister
His Attorneys

T. A. PEEBLES

May 9, 1933. APPARATUS FOR CONTROLLING STEAM GENERATION Re. 18,825

Original Filed July 22, 1926 4 Sheets-Sheet 3

INVENTOR
Thomas A. Peebles
By Green & McCallister
His Attorneys

T. A. PEEBLES

May 9, 1933. APPARATUS FOR CONTROLLING STEAM GENERATION Re. 18,825

Original Filed July 22, 1926 4 Sheets-Sheet 4

Inventor
Thomas A. Peebles

By

Attorney's

Reissued May 9, 1933

Re. 18,825

UNITED STATES PATENT OFFICE

THOMAS A. PEEBLES, OF MOUNT LEBANON, PENNSYLVANIA, ASSIGNOR TO JOHN M. HOPWOOD, OF DORMONT, PENNSYLVANIA

APPARATUS FOR CONTROLLING STEAM GENERATION

Original No. 1,675,818, dated July 3, 1928, Serial No. 124,248, filed July 22, 1926. Application for reissue filed March 11, 1933. Serial No. 660,409.

This invention relates to an apparatus for controlling the generation of steam and has for an object to produce a system of automatic control which proportions the delivery of fuel to a steam boiler in accordance with the demand for steam, and which maintains a predetermined standard of combustion, within the boiler furnace, for all varying rates of fuel feed.

A further object is to produce a control system for steam boilers which is automatic in response to variations in steam conditions and in which the delivery of fuel and air to the boiler furnace is proportioned to the varying steam conditions, but the delivery of air is so modified by the varying furnace conditions so as to maintain a predetermined standard of combustion conditions within the furnace for all rates of fuel feed to the furnace.

A further object is to produce a system of control for a plurality of steam boilers delivering steam to a single header in which automatic means are employed for proportioning the delivery of fuel to all the boilers in response to variations in the demand for steam or similar conditions within the header, and in which means are also employed for varying the delivery of air in response to steam conditions but in so modifying the delivery of air to each boiler furnace in response to the conditions therein encountered as to maintain a predetermined standard of combustion conditions in each individual boiler furnace for each varying rate of fuel feed.

A further object is to produce an automatic control system for a plurality of boilers delivering steam to a single header, in which a master regulator is employed for automatically controlling the operation of all the boiler furnaces included in the system and in connection with which means are employed for varying the operation of the master regulator so that conditions throughout the entire system may be varied even while the system is responding to the automatic operation of the master regulator.

A further object is to produce a system of control for a plurality of boilers constituting a unitary source of steam supply, in which automatic means are employed for controlling the operation of the individual furnaces of each of the boilers in responding to varying steam conditions and in which means are employed for adjusting the automatic regulation for each individual furnace so that individual regulation of each furnace may be accomplished while all or some of the other furnaces of the system are automatically controlled.

These and other objects, which will be made more apparent throughout the further description of the invention, are attained by means of the apparatus herein set forth and the method of control herein described.

In the drawings—

Figure 1 is a diagrammatic view of a control system embodying my invention;

Fig. 1*a* is a fragmental sectional view of a detail of the apparatus;

The apparatus herein illustrated is more particularly adapted to control the operation of a plurality of boilers wherein all of the boilers cooperate to deliver steam to a single steam line or header. In such installations, it is essential to maintain a predetermined standard of combustion conditions within each furnace and to proportion the delivery of fuel to the furnaces of the individual boilers in response to the demand for steam placed upon all the cooperating boilers.

In the illustrated embodiment of my invention, I have accomplished this by varying the fuel supply to all the boiler furnaces in response to variations in steam pressure within the steam header fed by all the boilers, and I then proportion the delivery of air to each individual furnace so as to maintain an air supply to each furnace which is proportional to the rate of fuel feed thereto but which is responsive to the varying conditions within the furnace and the gas outlet passages of the furnace.

In addition, I have provided a control system for controlling the fuel feed and air delivery to all the furnaces included within the system, which is responsive to a master regulator, but I have also employed what may be termed a primary regulator for each furnace of the group which may be adjusted so as to operate in response to the master regulator but at the same time vary the effect of the automatic control to each individual boiler furnace. In addition to this, the master regulator and the primary regulators are so constructed that they may each be manully controlled so that the automatic control may be temporarily removed from the entire group of boilers included in the system or may be temporarily removed from one or more boilers of the group. With this arrangement, standard conditions of operation may be more readily obtained in all the boilers of the group and the automatic regulation is thereby rendered more effective in maintaining the standard conditions under all the variables encountered in the operation of a boiler plant.

Figures 1, 1A:
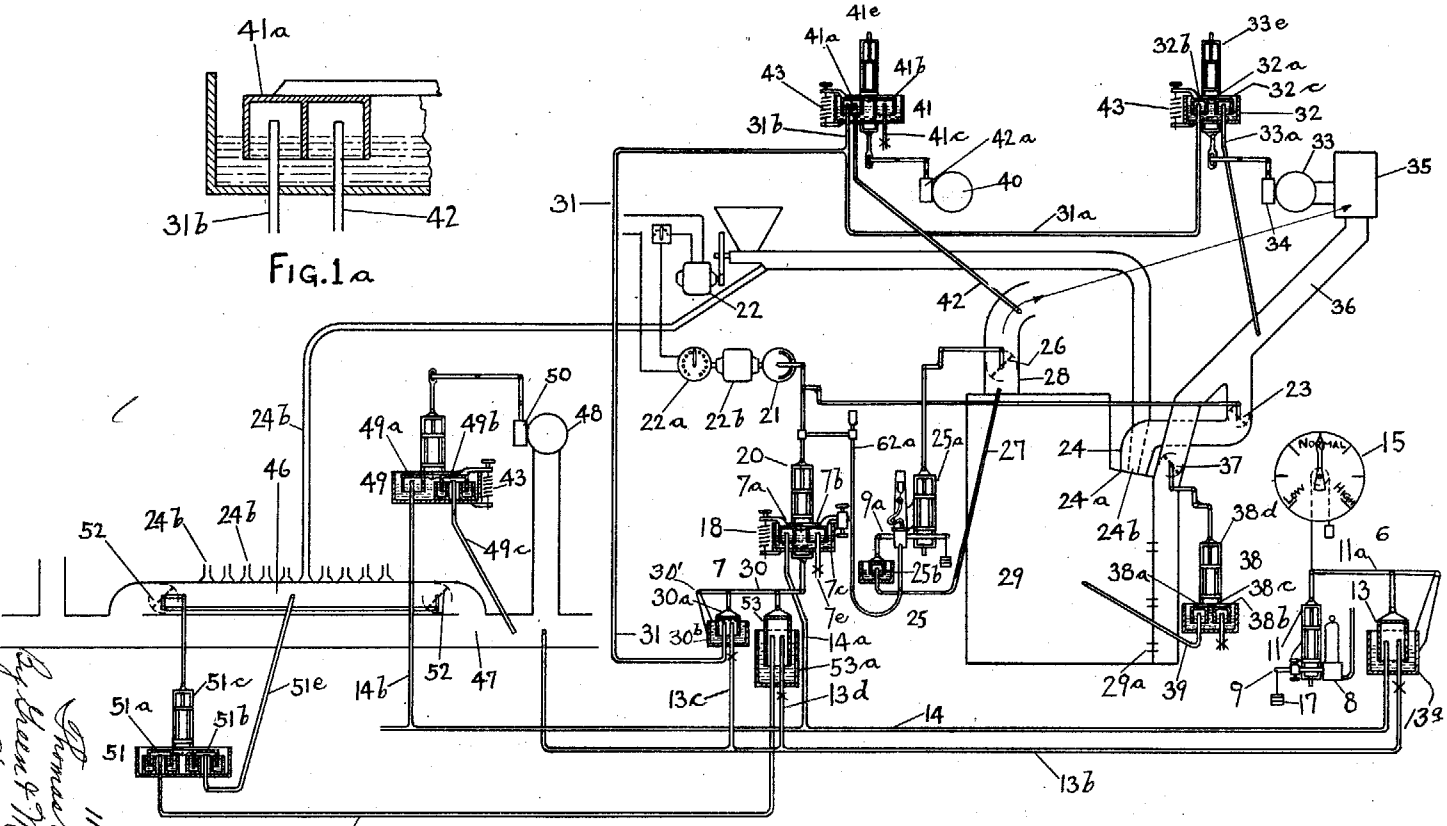

In Fig. 1, I have diagrammatically illustrated the control system in connection with but one boiler of a group of boilers, but it will be understood that the master regulator 6 is operatively connected to a plurality of primary regulators 7, one of which is employed for each boiler of the group.

The system is also illustrated in the form it would be employed for controlling a plurality of boilers fired with powdered fuel, but it will be apparent to those skilled in the art that the system with slight modifications may be employed for controlling the operation of stoker, or gas, or oil-fired boiler furnaces.

Figure 2:
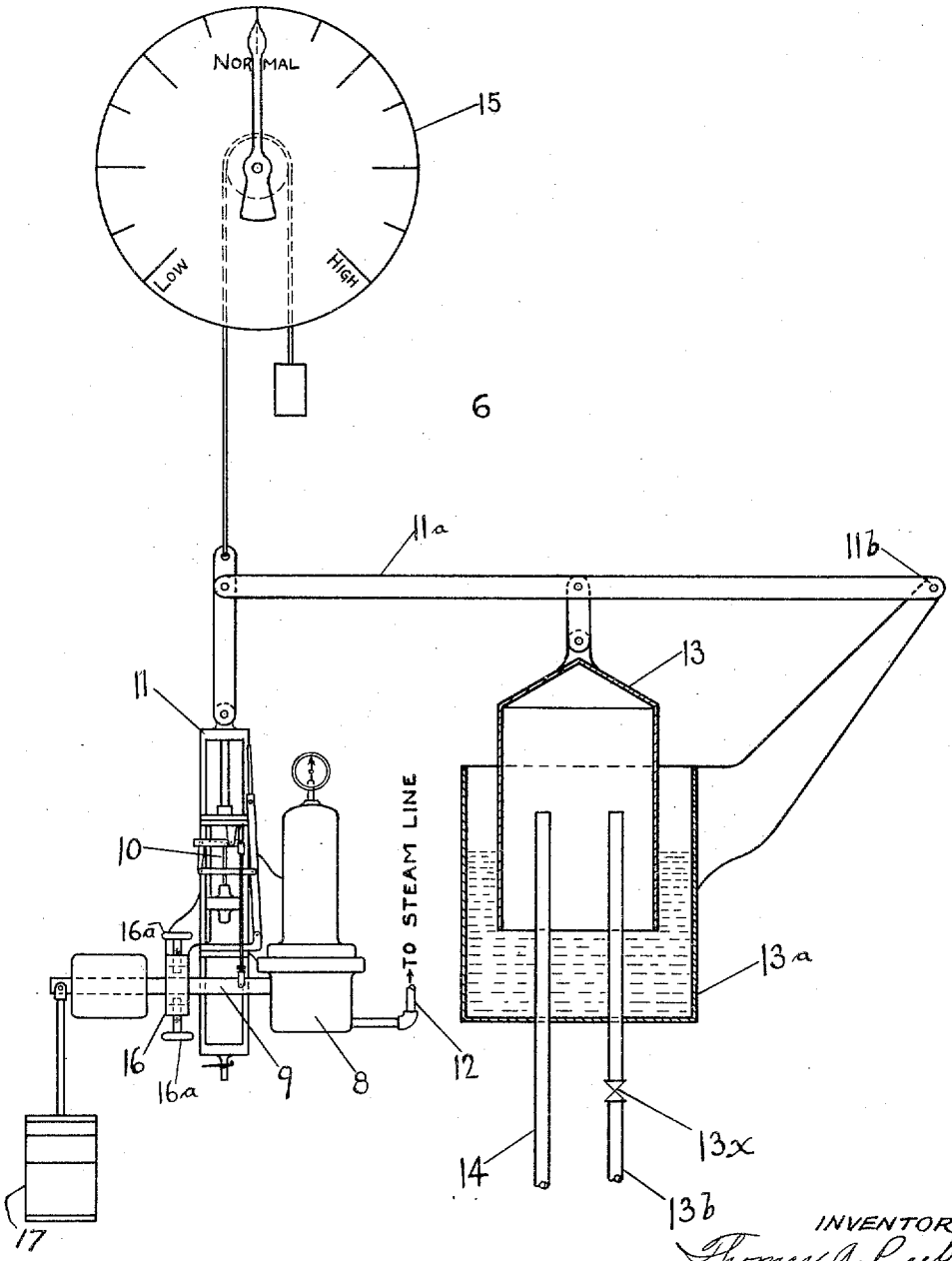
Fig. 2 is a detail view of a master regulator which may be employed as a part of the control system illustrated in Fig. 1.

As illustrated, the master regulator 6 is provided with a pressure responsive member which is located in a pressure chamber 8 and is operatively connected to a lever 9 so arranged that its movements, in response to varying steam pressure, control the operation of a pressure actuated relay mechanism 10 (see Fig. 2), the arrangement being such that the plunger of the relay and, consequently, the cross-head 11 operatively connected thereto, will occupy definite positions for the different positions of the lever 9. It will be understood that the pressure chamber 8 is connected to the steam header or steam line which receives steam from the various boilers of the group to be controlled, and that the pressure therein varies with the steam pressure. As indicated, the piping 12 communicates with this steam header.

I have provided simple and effective means for communicating the effect of the movement of the relay cross-head 11 to the control mechanism of the various boilers of the group. As illustrated, I employ an inverted bell 13, which is suspended by a suitable link from a lever $11^a$, fulcrumed at $11^b$ and which is actuated by the cross-head 11. The lower edge of this bell projects into liquid, such as water, oil or mercury, which is contained within a receptacle $13^a$. Air under pressure from a suitable source is delivered to the interior of the bell through piping $13^b$ which projects through the bottom of the receptacle and well above the surface of the liquid, terminating within the bell 13. This piping may be provided with a control valve $13^x$ for controlling the rate of air flow into the bell. A second piping 14 projects up through the bottom of the receptacle $13^a$ into the bell and is in open communication with the interior of the bell. This piping communicates with each of the primary regulators 7, one of which is preferably provided for each boiler included in the system.

It will be apparent that variations in steam pressure communicated to the pressure chamber 8 will occasion variations in the position of the cross-head 11, by reason of the operation of the lever 9, and consequently the bell 13 will be moved to different elevations, so that its lower edge is more or less effectively sealed by the liquid contained within the receptacle $13^a$, depending upon the amount of submergence of the lower edge of the bell. The source of air pressure with which the supply piping $13^b$ communicates is maintained at a higher pressure than can be sealed by the liquid in the receptacle $13^a$ no matter what position the bell 13 occupies with relation to the surface of that liquid. Consequently, during the normal operation of the apparatus, there will be a leakage of air from the interior of the bell around its lower edges and the pressure within the bell will respond to, and depend upon the position of the bell; or in other words, upon the head of sealing liquid maintained above the edge of the bell.

With such an arrangement, the pressure within the bell will vary as the bell moves to different positions and consequently this pressure will vary with variations in the steam pressure in the header as transmitted to the pressure chamber 8, with the result that the controlling pressure transmitted to all of the primary regulators 7 through the piping 14 will vary in response to variations in the steam pressure.

While I prefer to control the master regulator by means of variations in steam pressure, it will be apparent to those skilled in the art that the control may be accomplished by variations in the steam flow through the header without necessity of material changes in the master regulator. The master regulator is of the type illustrated in Hopwood Patent No. 1,371,243 of March 15, 1921, and a fuller description thereof is therefore deemed unnecessary.

I have also shown the master regulator operatively coupled to an indicator 15 by means of a flexible cord in such a way as to move the hand of the indicator to different positions around the indicator dial for the purpose of visually indicating the pressure within the steam header. I have also illustrated a manual control for the lever 9 which consists of a bracket 16 provided with oppositely positioned thumb screws $16^a$, adapted to engage opposite sides of the lever and thereby hold it in any definite adjusted position. It will be apparent that during the automatic operation of the apparatus, the thumb screws $16^a$ will be moved out of contact with the lever 9 and to such positions that they do not interfere with its swing. I have also shown the lever as counterbalanced by adjustable weights 17 which are so arranged that the counterbalancing of the steam pressure within the chamber 8 may be varied so as to effect or vary the automatic operation as occasioned by variations in this steam pressure.

In the drawings, I have illustrated but one of the primary regulators, which is generally designated by the numeral 7. See Figs. 1 and 3. This regulator includes two inverted bells $7^a$ and $7^b$ which are so positioned within a liquid receptacle $7^c$ that their lower edges are sealed by the liquid within the receptacle. These bells are mounted on a lever $7^f$ which is fulcrumed at an intermediate point between them and which controls the operation of a relay $7^d$. The branch $14^a$ of the piping 14 projects up through the bottom of the receptacle $7^c$ into the interior of the bell $7^a$ so that it terminates well above the level of the liquid within the receptacle. The movement of the bell $7^a$, and consequently of the lever $7^f$, in response to variations of pressure within the bell $7^a$, is controlled by an adjustable spring 18, which is operatively connected to an extension 19 of the lever. The bell $7^b$ is open to the atmosphere through a pipe $7^e$, which extends up through the bottom of the receptacle $7^c$ and is provided below the receptacle with a valve for restricting its effective area. With this arrangement, the bells and their supporting lever move to different positions in response to variations in the pressure transmitted through the piping 14, the movement being resisted or assisted by the tension of the spring 18. It will be understood that the bell $7^b$ merely functions as a dashpot and prevents excessive movements of the lever.

Each primary regulator 7 also includes a relay cross-head 20 which is operated by means of a pressure plunger, as described in connection with the master regulator, and which controls the delivery of fuel to its associated boiler furnace and also imposes a controlling effect on the delivery of air to that furnace.

As shown diagrammatically, the cross-head 20 is operatively connected to a rheostat 21, which indirectly controls the delivery of current to the coal feeding motors 22. This is accomplished by employing a motor-actuated relay $22^a$ for these motors which is actuated by a reversing motor $22^b$ controlled by the rheostat 21.

As I have stated, the diagrammatic illustration contemplates employing powdered coal as fuel; therefore, the motors 22 may operate coal pulverizing and conveying apparatus or they may merely operate coal conveying apparatus, the intent being to vary the delivery of fuel to each boiler furnace so that the rate of delivery corresponds to variations in steam pressure within the steam header fed by all the boilers of the system.

In order to insure prompt response to the automatic control, it is desirable to directly proportion at least a part of the air supply to the furnace, to the rate of fuel feed, and consequently I have illustrated the cross-head 20 as directly connected to a damper 23 which controls the delivery of secondary air through the fuel feed burner diagrammatically illustrated at 24. See Fig. 1. It will, of course, be understood that each boiler furnace will preferably be provided with a plurality of such burners, as is customary in powdered fuel installations of today, and that the relative proportions of air delivered through the air passages of the burners may be proportioned to suit conditions encountered.

From the foregoing, it will be apparent that variations in the steam pressure within the stem header receiving steam from all the boilers of the system will occasion variations in air pressure within the piping 14 and consequently within the bells $7^a$ of the various primary regulators 7, and that the cross-heads 20 of these regulators will therefore move to different positions and vary the rate of fuel delivery in the manner described. For example, a reduction in steam pressure will occasion an increase in the air pressure within the bell 13 by reason of the fact that the master regulator will, under such conditions, operate to lower the bell and increase the effectiveness of the sealing liquid around the lower edge of the bell. This will increase the pressure within the bell $7^a$ and cause it to move, in opposition to the tension of the spring 18, and will thereby occasion a lowering of the cross-head 20 which will increase the speed of the fuel feeding motors and will also increase the delivery of such portion of the combustion air as is delivered through the fuel feeding burners.

Each primary regulator 7 also imposes a control on the delivery of such additional air to its associated boiler furnace as is necessary to obtain complete combustion. It will, of course, be apparent that operating conditions may vary in each of the furnaces due to variations in the conditions of the furnace and the gas passages thereof and that it is therefore desirable, and in fact necessary, to control the delivery of the major portion of the air to each furnace in such a way that it is not only responsive to the varying rates of fuel feed but is also responsive to the conditions obtaining within the furnace and the gas passages thereof. In other words, it is not sufficient to merely actuate the air delivering or controlling apparatus so that its operation varies with the rate of fuel feed, since conditions within the furnace or within the gas passages of the furnace may be such as to necessitate a further adjustment of the air delivering or controlling apparatus in order to compensate for variations of conditions encountered therein.

In the apparatus illustrated, I control both the input and the withdrawal of air from each boiler furnace, and while this control is primarily responsive to the operation of the associated primary regulator, it is also modified by conditions which are or may be independent of the pressure of the steam within the main header.

Figure 3:
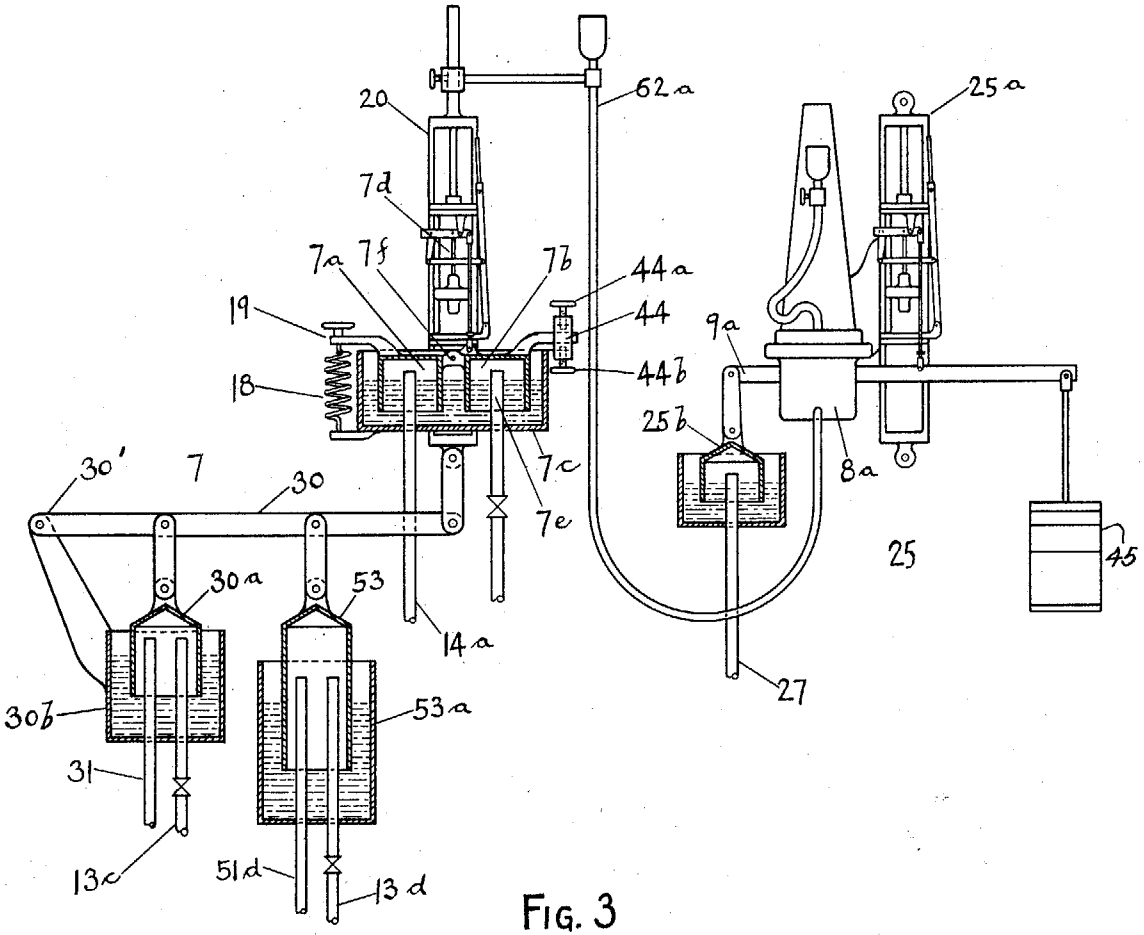
Fig. 3 is a diagrammatic view of a portion of the control system shown in Fig. 1.
Figure 4:
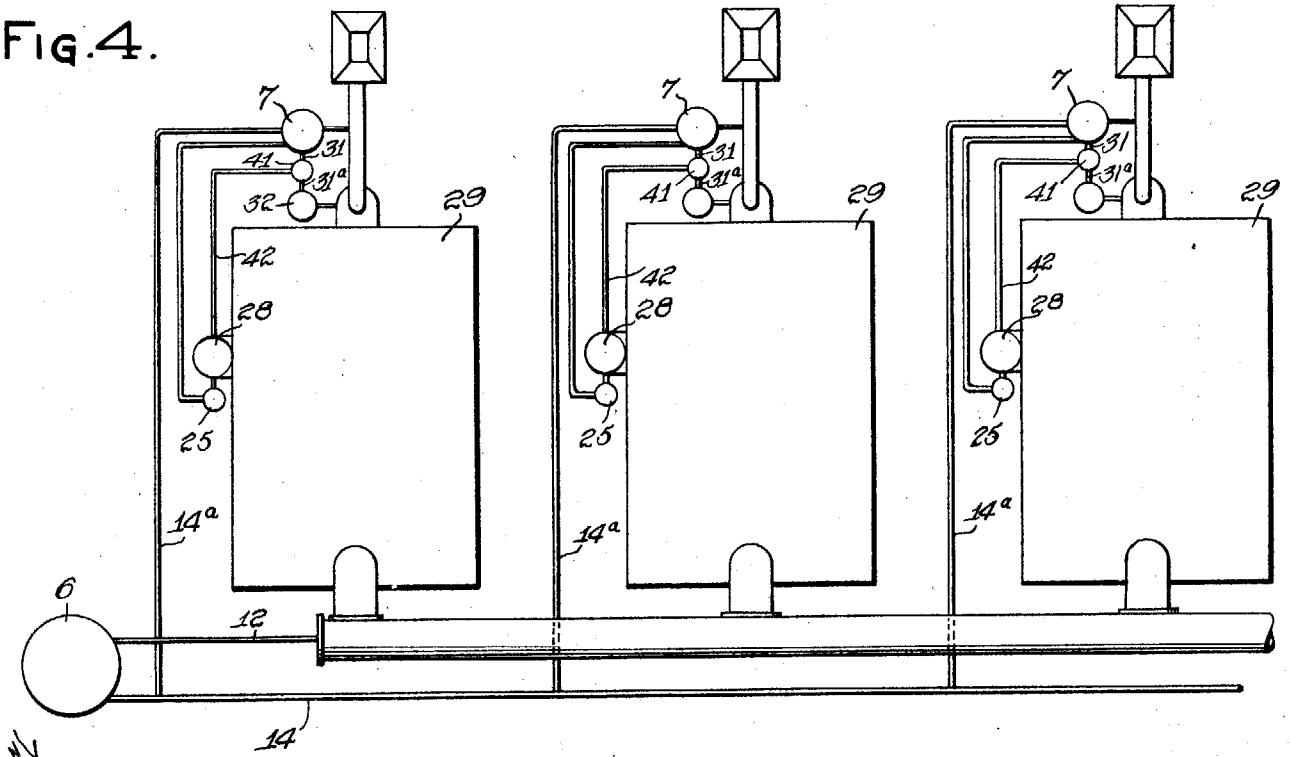
Fig. 4 is a diagrammatic view illustrating a battery of boiler furnaces provided with a control system arranged in accordance with one embodiment of this invention.

As shown in Figs. 1 and 3, the primary regulator controls the operation of a secondary regulator 25 which actuates a damper 26 located between the boiler furnace and the stack. The adjustment of this damper is, however, controlled through the secondary regulator by the joint action of the primary regulator and of the pressure existing within the furnace passages immediately adjacent to the damper 26, but on the furnace side of that damper.

This is accomplished by employing a regulator mechanism, similar to the mechanism described in connection with the master regulator 6 in which the pressure chamber $8^a$ is directly connected to a flexible tube $62^a$ which contains a column of liquid such as mercury and is so connected to the cross-head 20 of the primary regulator 7 that variations in the position of that cross-head 20 occasion variations in the head of the liquid contained within the tube and consequently occasion variations in the effective pressure within the chamber $8^a$. The pressure-responsive element of this chamber is operatively connected to a pivoted lever $9^a$, which controls the operation of a relay cross-head $25^a$ in the manner heretofore described. The effect of the pressure in the chamber $8^a$ on the lever $9^a$ is opposed or modified by a bell $25^b$, operatively connected to the lever. As shown, the bell is inverted and extends into a liquid receptacle such as is above described, and piping 27 projects through the bottom of the receptacle and into the interior of the bell $25^b$ above the sealing liquid contained within the receptacle.

This piping is in open communication with the gas discharge passage or the breaching 28 of the boiler furnace 29, the point of communication being on the furnace side of the damper 26, which is located within the passage 28. Under such conditions, variations in pressure within the passage 28 will impose a controlling or modifying effect on the operation of the regulator 25, with the result that the cross-head $25^a$ will respond to the composite effect occasioned by movements of the primary regulator 7 and by variations in pressure at the furnace side of the damper 26.

It will, of course, be understood that under normal operating conditions a negative pressure, i. e. a pressure below atmospheric pressure, is encountered in the offtake passages from the boiler furnace and that, therefore, the pressure within the bell $25^b$ will be less than atmospheric pressure, with the result that this negative pressure will, to some extent, offset or counterbalance the positive pressure occasioned by the column of liquid contained within the tube $62^a$.

With this arrangement, the rate of fuel delivery to each boiler furnace 29 will vary directly in response to variations in steam pressure and the secondary regulator 25 will adjust the position of the damper 26 so as to maintain the proper conditions within the offtake passages of the boiler furnace for the rate of fuel feed encountered.

The delivery of the major portion of air for combustion is also controlled by the primary regulator 7, but the effect of this regulator is so modified by conditions within the furnace as to provide the requisite air supply for complete combustion of all the fuel delivered even under the varying conditions which may be occasioned by the particular installation or the varying conditions of the apparatus employed as a part of the installation.

As shown, the cross-head 20 of the primary regulator 7 is operatively connected to a lever 30, fulcrumed at 30′ and from which a bell $30^a$ is suspended. The lower edge of this bell is submerged in a liquid contained within a receptacle $30^b$ and a restricted flow of air from the piping $13^b$ or from a source of suitable pressure is delivered to the interior of the bell through piping $13^c$. The pressure of this air is greater than that which can be sealed by the sealing liquid within the receptacle $30^b$. Piping 31 communicates with the interior of the bell $30^b$ and therefore transmits a pressure which is directly proportional to the position of the bell with relation to the level of its sealing liquid in the receptacle $30^b$. This pressure is transmitted through a branch pipe $31^a$ to a forced draft regulator 32 which may be of the conventional form described in connection with the primary regulator 7. As shown, the regulating lever $32^a$ of this regulator is provided with two inverted bells $32^b$ and $32^c$, each of which projects into a sealing liquid contained within a suitable receptacle. The pressure carried by the branch pipe $31^a$ is introduced into the interior of the bell $32^b$ and the pressure delivered by a forced draft fan 33 is introduced into the interior of the bell $32^c$ through piping $33^a$. The relay cross-head $33^e$ is operatively connected to the control valve 34 of the engine (not shown) driving the fan 33, and the arrangement is such that as the pressure increases within the piping 31—31*a*, due to a reduction in the steam pressure, the relay $33^e$ will move to admit more steam through the valve 34 of the driving engine of the fan and thereby increase the delivery of forced draft to the furnace 29.

As diagrammatically shown, the fan 33 delivers air through a preheater 35 and then through a passage 36 to the air inlet ports $29^a$ of the boiler furnace. In order to insure the proper delivery of air, in response to the variations occasioned by the operation of the primary regulator 7, and independently of the conditions which may exist in the preheater 35 or connecting passages, the piping $33^a$ communicates with the passage 36 on the furnace side of the preheater. With such an arrangement, the speed of the motor driving the forced draft fan will be determined by the steam pressure in the main header as modified by conditions encountered within the air delivery passage 36, with the result that the position of the cross-head 20 will not actually determine the speed of the forced draft fan but will merely insure such an operation of the fan as may be necessary to furnish sufficient air for occasioning complete combustion at the rate of fuel feed encountered.

The delivery of air to the furnace is, however, directly controlled by the conditions within the combustion chamber of the furnace. This is accomplished by providing a damper 37 in the passage 36 and by employing a regulator 38, responsive to combustion chamber pressure, for controlling the operation of that damper.

As diagrammatically shown, the damper 37 controls the delivery of air through ports $29^a$ formed in a wall of the furnace 29 in accordance with the approved practice employed in connection with powdered fuel firing. It will, of course, be understood that a number of dampers may be employed for controlling the delivery of air through the wall ports, and that it is not essential to my invention that this air be preheated or even that it be delivered under pressure, although it is necessary to proportion its delivery to the rate of fuel feed.

As shown, the regulator 38 is of the type illustrated and described in connection with the primary regulating apparatus 7 and includes two inverted bells $38^a$ and $38^b$ which are mounted on either side of the fulcrum point of a lever $38^c$ which controls the operation of a pressure actuated cross-head $38^d$. The cross-head is operatively coupled to the damper 37 and the pressure of the combustion chamber is introduced into the inverted bell $38^a$ through a pipe 39 which extends upwardly through the sealing liquid of that bell. The interior of the bell $38^b$ is in open communication with the atmosphere through a restricted passage and that bell acts as a dashpot for checking the movements imparted to the lever by the bell $38^a$. The arrangement is such that, as the pressure increases within the combustion chamber, the bell $38^a$ responding to the increase in pressure swings the lever, and this in turn causes the cross-head $38^d$ to move downwardly and close the damper an amount corresponding to the increase in pressure, and vice versa, if the pressure in the combustion chamber decreases.

From the foregoing, it will be apparent that the delivery of a portion of the air to the combustion chamber is controlled directly by the primary regulator 7 and that the delivery of the remaining portion is responsive to variations in steam pressure as modified by the pressure within the combustion chamber and communicating discharge passages. This dual control is occasioned by the fact that the adjustment of the damper 23 controlling the air flow through the ports $24^a$, forming a part of the fuel feed burner, is controlled directly by the primary regulator 7, since the adjustment of the damper 23 depends solely upon the positioning of the relay cross-head 20; whereas the additional air delivered to the furnace is responsive to the combined effect of the variations in steam pressure as modified by pressure conditions within the furnace and furnace passages as impressed on the regulators 25, 32 and 41, and as further modified by the action of the regulator 38.

In the diagrammatic illustration, I have shown an induced draft fan 40 for removing waste gases through the gas passage 28. This fan is controlled by the combined effect of the regulator-adjusted air pressure delivered through the piping 31 and of the reduction in pressure occasioned by the operation of the fan 40 and the particular adjustment of the damper 26 in the waste gas passage 28. As shown, the adjusted air pressure from the bell $30^a$ of the primary regulator 7 is delivered to an inverted bell $41^a$ of a regulator 41. This regulator is similar to the regulator 32 shown in connection with the forced draft fan, except that the bell $41^a$ is divided into two compartments, one of which receives the air pressure introduced through the branch pipe $31^b$ and the other of which is subjected to the reduction in pressure occasioned by the piping connection 42. The composite bell $41^a$ is mounted on one end of a pivoted lever which controls the operation of a pressure actuated cross-head $41^e$. An inverted bell $41^b$ is mounted on the other end of this lever and its interior is subjected to atmospheric pressure through a restricted passage $41^c$, it being understood that the interiors of both the bells are sealed by a sealing liquid in the manner heretofore described.

The induced draft fan 40 is driven by a steam engine or turbine (not shown), the valve $42^a$ of which is controlled by the cross-head $41^e$. The arrangement is such that the valve is opened to increase the speed of the forced draft fan as the cross-head $41^e$ moves in response to a decrease in the pressure delivered through the branch pipe $31^b$. It will, of course, be apparent that the pressure delivered through this pipe is counterbalanced by the reduced pressure communicated through the piping 42, and that consequently, the operation of the fan 40 is controlled by the pressure in the waste gas offtake 28 and in the piping 31 from the regulator 7 In other words, it may be said that the induced draft fan operates in response to variations in steam pressure, as modified by variations in pressure encountered within the passage 28. It will also be apparent that these last variations referred to are dependent not only upon the speed of the fan but also on the adjustment of the damper 26, with the result that the operation of the fan 40 is modified by the drop in pressure across the damper 26. It will also be apparent that the pressure within the passage 28 will also depend upon the rate of combustion within the furnace.

Both of the regulators 32 and 41 are provided with adjustable springs 43 which are so arranged as to oppose the movement in one direction of the associated levers and that therefore the automatic operation of the two fans may be adjusted or varied at will by changing the adjustment of these springs.

Attention is also called to the fact that each primary regulator 7 is, like the master regulator, provided with means for rendering it non-automatic or for rendering it a manually controlled mechanism. As shown in Fig. 3, the regulator 7 is provided with a bracket 44 which straddles an extension of the lever $7^f$ and which is provided with oppositely projecting thumb screws $44^a$ and $44^b$ adapted to engage opposite sides of the extension and therefore hold the lever in a definite adjusted position in the manner described in connection with the master regulator. These thumb screws and the bracket 44 are however so positioned that they will not interfere with the normal swing of the lever $7^f$ when the screws are adjusted for automatic operation of the regulator 7.

From the foregoing, it is apparent that the entire operation of a boiler plant may be controlled automatically by the master regulator 6, and under such conditions that the rate of fuel feed to each boiler furnace of the controlled group will vary in response to variations in the steam pressure within a header fed by all of the boilers of the group. It will also be apparent that a portion of the air for combustion will be controlled directly in response to the variations in this steam pressure or to the variations in the rate of fuel supply, but that the remaining air delivered to each boiler furnace will be proportioned in accordance with conditions encountered within the furnace and the waste gas passages thereof.

It will also be apparent that the entire group of boilers may be manually controlled by means of the thumb screws associated with the bracket 16 of the master regulator or that any of the boiler furnaces may be manually controlled by means of the thumb screws $44^a$ and $44^b$ of the primary regulators while some of the boilers of the group are responding to the automatic control initiated by the master regulator. It will also be apparent that the conditions of automatic control may be varied materially or adjusted for each furnace by varying the adjustment of the spring 18 of the primary regulator 7 associated with each furnace; or by varying the amount of counterbalancing weight 45 employed in connection with the control lever of the secondary regulator 25; or by varying the tension of the springs 43 of either or both of the fan control regulators.

In the drawings I have diagrammatically shown means for varying the rate of delivery or the pressure of the fuel conveying air delivered to the burners with which each boiler furnace of the controlled group is equipped. As illustrated, the conveying air to each of the burners 24 may be delivered through one of a number of suitable passages $24^b$ which communicates with an auxiliary air duct 46 in which the air pressure is proportioned to the rate of fuel delivery.

As shown, the auxiliary air duct 46 communicates with a primary air duct 47, which receives air under pressure from a fan 48. One or more such fans may be employed depending upon the number of furnaces constituting the unit. The driving engine (not shown) of the fan 48 is controlled by a regulator 49 which is similar to the regulator 32 and which controls the opening and closing of the engine valve 50. As shown, the regulator 49 is provided with two inverted bells $49^a$ and $49^b$, both of which are sealed by a sealing liquid as previously described. The interior of the bell $49^a$ receives air under pressure from the master regulator through the piping 14 and a branch pipe $14^b$. The effect of this air pressure is counterbalanced by delivering air to the interior of the bell $49^b$ through piping $49^c$ which communicates with the primary air duct and is in open communication with the delivery port of the fan 48. The regulator 49 is also provided with an adjustable control spring 43, and the arrangement is such that a decrease in steam pressure, reflected by the master regulator by a corresponding increase in the pressure delivered through the line 14 and $14^b$, will occasion a speeding up of the fan 48, but the speed of the fan is modified by the pressure of the air in the primary air duct 47, by reason of the fact that the regulator 49 is also responsive to the pressure within that duct. As a result of this, a decrease in this pressure will, under most conditions of operation, actuate the regulator to increase the speed of the fan 48 and return the pressure to substantially normal pressure.

I preferably employ a separate auxiliary air duct 46 for each boiler furnace of the controlled group, and as will be described, the delivery of fuel conveying air to each furnace is proportioned to the rate of fuel delivery to that furnace. In the apparatus illustrated, this is accomplished by controlling the delivery of air to each auxiliary duct 46 by means of a regulator 51 which responds to the operation of the primary regulator 7 associated with the particular boiler with which the auxiliary air duct 46 is associated.

As shown, communication between the auxiliary air duct 46 and the main duct 47 for fuel conveying air, is controlled by the regulator 51 in response to the operation of the particular primary regulator 7 with which it is associated, and which in turn controls the operation of dampers 52 between the primary air duct and the duct 46. The regulator 51 may be similar to the regulators heretofore described and is provided with two inverted bells $51^a$ and $51^b$ mounted on a pivoted lever and having their interiors sealed by a sealing fluid. These inverted bells also control the operation of a pressure-actuated cross-head $51^c$ which is operatively connected to the dampers 52. The interior of the bell $51^a$ communicates through piping $51^d$ with the interior of a bell 53 which is mounted on the lever 30 forming a part of the primary regulator 7, and the bell $51^b$ is mounted on the opposite end of said lever and its interior is subjected to the pressure within the auxiliary duct 46 through piping $51^e$.

The bell 53 is suspended by a suitable link from the lever 30, which as previously described, is actuated by the cross-head 20 of the associated primary regulator 7. The lower edge of this bell extends into a sealing liquid contained within a receptacle $53^a$ and air under pressure is delivered to the interior of the bell through a branch pipe $13^d$ from the pipe $13^b$, in the manner described in connection with the bell 13 of the master regulator. The depth of the sealing liquid contained within the receptacle $53^a$ is not sufficient to seal the pressure introduced to the interior of the bell through the piping $13^d$ and consequently the air pressure within the bell will vary with the position of the bell relatively to the surface of its sealing liquid. This adjusted pressure varies with variations in the position of the cross-head 20 and consequently with variations in the steam pressure controlling the master regulator 6. The pressure within the bell 53 is delivered to the bell $51^a$ through the piping $51^d$ and, as a result of this, the regulator 51 will respond to variations in steam pressure as modified by the operation of the master regulator 6 and the associated primary regulator 7. In addition, the operation of the regulator 51 is modified by the air pressure within the auxiliary air duct 46, with which it is associated, by reason of the fact that the piping $51^e$ delivers this air pressure to the interior of the bell $51^b$.

It will, therefore, be apparent that as the demand for an increased rate of fuel feed occurs, the regulator 51 will tend to open the dampers 52 and increase the delivery of air from the primary air duct to the secondary air duct 46 which supplies fuel conveying air to the associated fuel feed burners. This tendency is subject to the modifying effect of the air pressure within the auxiliary duct which, to some extent, is dependent upon conditions within the associated furnace; but under normal operating conditions, the regulator 51 will operate to increase the rate of delivery of the fuel conveying air as the rate of delivery of fuel is increased in response to decreasing steam pressure within the header supplied by the boilers of the controlled unit.

As diagrammatically shown, the sealing liquid receptacles for the bells $51^a$, $51^b$ and $49^b$ are especially formed to receive a heavy sealing liquid such as mercury, and it will be apparent that various modifications such as these may be employed throughout the installation without departing from the spirit or scope of this invention, since I am not primarily concerned with the type of regulators employed nor with the specific details of their construction. The broad underlying principle of my invention is to so control combustion conditions within the various furnaces included in the system as to obtain efficient operation of each of the furnaces and at the same time a co-ordination of all the furnaces which will uniformly distribute the load on the different boilers and will automatically maintain the desired steam pressure conditions.

A further feature of the apparatus illustrated is that the entire system or any portion thereof associated with an individual boiler may be rendered non-automatic so that all or any one of the boilers may be placed under the direct control of an attendant for the purpose of establishing the desired conditions.

What I claim as new and desire to secure by Letters Patent is:

1. A steam generating system, comprising a plurality of steam generators, a common header receiving steam from said generators, and an individual furnace for each generator, fuel feeding mechanisms for each furnace, air supplying mechanisms for each furnace, a separate regulator responsive to variations in steam conditions within said header for controlling the operation of each furnace, a regulator responsive to variations in steam conditions within said header, as reflected by said first mentioned regulator and as modified by pressure conditions within the air delivery passages to the furnace for controlling the operation of said air supply mechanisms, and a regulator responsive to variations in pressure within the furnace for controlling the delivery of a portion of the air from said air supplying mechanisms to said furnace.

2. A steam generating system comprising a plurality of steam generators, a common header receiving steam from said generators, and an individual furnace for each generator, fuel feeding mechanisms for each furnace, air supplying mechanisms for each furnace, a separate regulator responsive to variations in steam conditions within said header for controlling the operation of each furnace, a regulator responsive to variations in steam conditions within said header, as reflected by said first mentioned regulator and as modified by pressure conditions within the air delivery passages to the furnace for controlling the operation of said air supply mechanisms, a regulator responsive to variations in pressure within the furnace for controlling the delivery of a portion of the air from said air supplying mechanisms to said furnace, and means actuated by said first mentioned regulator for controlling a portion of the air supply to the furnace.

3. A system of control, comprising a plurality of steam generators, a steam header receiving steam from said generators, an individual furnace for each generator, fuel feeding mechanisms for each furnace, air delivery mechanisms for each furnace, a master regulator responsive to variations in steam pressure within said header, a fluid distribution system, means actuated by said regulator for occasioning pressure variations in a fluid distribution system responsive to the variations in pressure within said header, a separate regulator responsive to variations in fluid pressure within said system for controlling the operation of each fuel feeding mechanism, and a separate regulator for controlling the operation of each air delivery mechanism, responsive in operation to the operation of said last-mentioned regulator and to the air pressure delivered by said air delivery mechanism.

4. A system of control including a plurality of steam generators, a steam header receiving steam from said generators, an individual furnace for each generator, individual fuel feeding mechanisms for each furnace, individual draft regulating mechanisms for each furnace, a master regulator responsive to variations in steam pressure within said header, a fluid distribution system, means actuated by said regulator for occasioning pressure variations in said distribution system corresponding to variations in pressure in said header, a primary regulator associated with each furnace and subject to said pressure variations, a separate regulator for each furnace responsive to said primary regulator and to pressure variations within said system for controlling the fuel feeding mechanisms of the associated furnace, and a separate regulator for each furnace responsive to pressure variations within said system for controlling the associated draft regulating mechanisms and responsive to the draft pressure supplied to the associated furnace.

5. A system of furnace control including a plurality of steam generators, an individual furnace associated with each generator, a steam header receiving steam from all said generators, individual fuel feeding mechanisms for each furnace, individual air supplying mechanisms for each furnace, individual draft control mechanisms for each furnace, a primary regulator for each furnace responsive to variations in steam pressure within said header for controlling the delivery of fuel to the associated furnace, a secondary regulator for each furnace responsive to the operation of said primary regulator and to the pressure within the waste gas passages of the furnace for controlling the operation of said draft regulating mechanisms, and a regulator responsive in operation to the operation of said primary regulator and to the pressure delivered by said air supply mechanisms for controlling the operation of said air supplying mechanisms.

6. A system of furnace control including a plurality of steam generators, an individual furnace for each generator, a steam line receiving steam from all the generators, a master regulator responsive to variations in steam pressure within said line, a fluid distribution system, means actuated by said regulator for occasioning variations in fluid pressure within said system, a primary regulator associated with each furnace and responsive to variations in pressure within said distribution system, individual fuel feeding mechanisms for each furnace responsive to the operation of said primary regulator, a separate secondary regulator for each furnace responsive to the operation of said primary regulator and to variations in draft pressure of the associated furnace, draft regulating means controlled by said secondary regulator, individual air supplying mechanisms for each furnace, and a regulator responsive to variations in furnace pressure for controlling the delivery of air from said air supplying mechanisms to the associated furnace.

7. A system of furnace control including a steam generator, a furnace associated therewith, a steam header receiving steam from said generator, a master regulator responsive to variations in steam pressure within said header, a fluid distribution system, means actuated by said regulator for occasioning variations in fluid pressure within said system, a primary regulator responsive to fluid pressure variations within said system, fuel feeding mechanisms for said furnace controlled by said primary regulator, a second fluid distribution system, means actuated by said primary regulator for occasioning variations in fluid pressure within said second system, air delivery mechanisms for said furnace, a regulator responsive to variations in pressure within said second system and to variations in pressure delivered by said air delivery mechanisms for controlling said air delivery mechanisms, draft controlling mechanisms, and a regulator responsive to variations in fluid pressure within said second distribution system and to variations in draft pressure for controlling the operation of said draft controlling mechanisms.

8. A system of furnace control, comprising a plurality of steam generators, an individual furnace for each generator, a steam header receiving steam from all the generators, individual fuel feeding mechanisms for each furnace, individual forced draft mechanisms for each furnace, individual induced draft mechanisms for each furnace, a master regulator responsive to variations in steam pressure within the header, a primary regulator for each furnace responsive to the operation of said master regulator in controlling the fuel feeding mechanisms of the associated furnace, a separate regulator for each furnace responsive in operation to the associated primary regulator and controlling the forced draft mechanisms of the associated furnace, and an induced draft regulator for each furnace responsive in operation to the associated primary regulator for controlling the operation of said induced draft mechanisms of the associated furnace.

9. A system of control for a pulverized fuel burning furnace, comprising a steam generator, a furnace associated therewith, pulverized fuel feeding mechanisms, forced draft delivery mechanisms, induced draft delivery mechanisms, fuel conveying air delivery mechanisms, a regulator responsive to variations in steam pressure delivered by said generator, and separate cooperating regulators responsive to said first-mentioned regulator for controlling each of said mechanisms.

10. A system of furnace control including a plurality of steam boilers, a separate furnace for each boiler, a separate means for delivering fuel to each furnace, separate means for delivering air to each furnace, a separate regulator for controlling each such means, a separate primary regulator associated with each furnace, means controlled by said primary regulator for controlling the delivery of actuating fluid to each of said first mentioned regulators, adjustable means associated with each of said first mentioned regulators for independently varying the effect of the actuating pressure delivered thereto.

11. A system of control for a plurality of boilers, all delivering steam to a common header, and each provided with a furnace, a separate regulator for each furnace for controlling the supply of air thereto, a separate regulator for each furnace for controlling the supply of fuel thereto, a primary regulator for each furnace responsive in operation to variations in the steam supply within said header, means controlled by said primary regulator for controlling the operation of the other regulators associated with the furnace, and adjustable means on each of said last-mentioned regulators for individually varying the control of said primary regulator.

12. In a system of boiler control, a plurality of boilers to be controlled, a separate furnace for each boiler, a plurality of regulators associated with each furnace for separately controlling combustion conditions therein, a primary regulator associated with each furnace for controlling the other regulators associated therewith, a master regulator responsive to variations of steam supply delivered by all of said furnaces, means actuated thereby for controlling all primary regulators, and means associated with each primary regulator for varying or rendering ineffective the control of said master regulator.

13. In combination in a system of boiler control, a boiler, a furnace therefor, means for controlling the draft of said furnace, means for delivering fuel to said furnace, means for controlling said first-mentioned means in accordance with variations in the rate of fuel fed by said fuel delivery means, means responsive to variations in the steam supply delivered by said boiler for controlling the delivery of air to said furnace, and means controlled by the pressure within the furnace for controlling the delivery of additional air to the furnace.

14. In combination with a boiler furnace, means for delivering pulverized fuel to said furnace, means for delivering fuel conveying air to said furnace, means for controlling said air delivery means to maintain a predetermined air pressure, and means for proportioning the pressure of the fuel conveying air delivered to said furnace in accordance with variations in the rate of fuel feed.

15. In combination with a boiler furnace, means for delivering pulverized fuel thereto, means for delivering fuel conveying air to said furnace, and means for varying the pressure of the fuel conveying air in accordance with variations in the rate of fuel feed thereto.

16. In combination with a boiler furnace, means for delivering pulverized fuel thereto, means for delivering fuel conveying air to said furnace in response to variations in steam pressure delivered by the boiler, means for varying the pressure of the fuel conveying air in response to variations in steam pressure delivered by the boiler and means for controlling the delivery of air for combustion to said furnace in accordance with draft conditions within the furnace.

17. In combination in a control system, a regulator, means for delivering actuating fluid pressure to said regulator, comprising an open end bell, having its open end submerged in a sealing liquid, means for delivering fluid to said bell at a pressure greater than can be sealed by said liquid, means for delivering fluid pressure from said bell to said regulator, and means for varying the position of said bell with relation to the surface of said sealing liquid to vary the pressure of the fluid so delivered.

18. A system of boiler control including a boiler and furnace therefor, comprising a fan for delivering air for combustion to said furnace, a regulator for controlling the operation of said fan, a second regulator responsive to variations in steam delivery from said boiler, means actuated by said second regulator for controlling the delivery of actuating fluid pressure to said first regulator, and means associated with said first regulator for counterbalancing said actuating fluid by air pressure delivered by said fan.

19. A system of boiler control including a boiler and a furnace therefor, comprising an air duct from which air is delivered to said furnace, a regulator for controlling the pressure of the air within said duct, a second regulator, responsive to variations in the steam supply delivered by said boiler, means actuated by said second regulator for varying the actuating pressure delivered to said first regulator, and means associated with said first regulator and receiving air pressure from said duct for counterbalancing the effect of said actuating pressure on said first regulator.

20. A system of boiler control including a boiler and a furnace therefor, comprising a plurality of regulators for separately controlling the forced draft, the induced draft and the delivery of fuel to said furnace, a master regulator, responsive to variations in steam supply in a header receiving steam from said boiler, a primary regulator, means controlled by said master regulator for delivering actuating pressure to said primary regulator, and means controlled by said primary regulator for delivering actuating pressure to said plurality of regulators.

21. A system of boiler control including a boiler and a furnace therefor, comprising a plurality of regulators for separately controlling delivery of fuel and draft conditions within said furnace, means for delivering variable actuating pressure to each of said regulators, a primary regulator controlling said means and responsive to variations in steam supply within a header receiving steam from said boiler, and means associated with each of said plurality of regulators for subjecting each such regulator to a variable pressure controlled by the regulator subjected to such control.

22. A system of boiler control including a boiler and a furnace therefor, comprising a plurality of regulators for separately controlling the delivery of fuel, and the draft conditions within said furnace, a primary regulator, responsive to steam conditions within a header fed by said boiler, means, controlled by said primary regulator, for delivering actuating fluid pressure to each of said first-mentioned regulators, and means associated with each of said regulators for subjecting the same to the influence of a second fluid pressure variable in response to the operation of the regulator so influenced.

23. In combination in a system of boiler furnace control, a plurality of boiler furnaces all delivering steam to a common header, fuel and air-supply mechanisms associated with each furnace, regulators for controlling the operation of said mechanisms, a primary regulator associated with each furnace for controlling the operation of said first-named regulators, and a master regulator responsive to variations in the pressure in said header for controlling the operation of said primary regulators.

24. In combination in a system of boiler furnace control, a plurality of boiler furnaces delivering steam to a common header, fuel and air-supply mechanisms associated with each furnace, regulators for controlling the operation of said mechanisms, a primary regulator associated with each furnace for controlling the operation of said first-named regulators, a master regulator responsive to variations in the pressure in said header for controlling the operation of said primary regulators, and means for operating any of said primary regulators independently of said master regulator.

25. In combination in a system of boiler furnace control, a plurality of boiler furnaces, fuel and air-supply mechanisms associated with each furnace, regulators for controlling the operation of said air-supply mechanisms, a primary regulator associated with each furnace for controlling the operation of the associated fuel-supply mechanism, connections whereby the operation of each of said first-named regulators is controlled by the associated primary regulator, and a master regulator for controlling the operation of said primary regulators.

26. In a system of boiler furnace control, a plurality of boilers to be controlled, a separate furnace for each boiler, a plurality of regulators associated with each furnace for separately controlling combustion conditions therein, a primary regulator associated with each furnace for controlling the other regulators associated therewith, a master regulator responsive to variations in steam supply delivered by all of said furnaces for controlling the operation of said primary regulators and means for manually controlling the operation of said master regulator independently of said variations in steam supply.

THOMAS A. PEEBLES.